United States Patent [19]

Tomimatsu

[11] Patent Number: 5,590,588
[45] Date of Patent: Jan. 7, 1997

[54] APPARATUS FOR SUPPLYING A PREDETERMINED AMOUNT OF FOOD STUFFS

[75] Inventor: Kazunari Tomimatsu, Mie, Japan

[73] Assignee: Fuji Electric Co., Ltd., Kawasaki, Japan

[21] Appl. No.: 397,694

[22] Filed: Mar. 2, 1995

[30] Foreign Application Priority Data

Mar. 3, 1994 [JP] Japan .................................. 6-032761
May 30, 1994 [JP] Japan .................................. 6-115798

[51] Int. Cl.$^6$ ................................................ A47J 37/10
[52] U.S. Cl. ...................... 99/423; 99/349; 99/443 C; 222/272; 222/281
[58] Field of Search ............................. 99/423, 373, 349, 99/342, 330, 443 R, 443 C; 198/604, 468.11; 222/271, 272, 280, 281, 380; 425/308, 296, 297; 100/98 R

[56] References Cited

U.S. PATENT DOCUMENTS

| | | | |
|---|---|---|---|
| 2,388,805 | 11/1945 | Stahl | 100/98 R |
| 2,591,970 | 4/1952 | Seegers et al. | 100/98 R |
| 4,552,523 | 11/1985 | Suzuki | 425/308 |
| 4,691,848 | 9/1987 | Gianese | 222/280 |
| 5,200,203 | 4/1993 | Hayashi | 425/308 |
| 5,307,736 | 5/1994 | Sorensen | 99/330 |

*Primary Examiner*—David Scherbel
*Assistant Examiner*—Reginald L. Alexander
*Attorney, Agent, or Firm*—Kanesaka & Takeuchi

[57] ABSTRACT

In an apparatus for supplying a predetermined amount of cooking materials, a pair of conveyer belt mechanisms 2 synchronously running along both sides of a material supply path is provided in a storage 1 for accommodating cooking materials, such as chopped vegetables. The cooking materials 6 filled in the material supply path between the belts are conveyed to the exit side of the path corresponding to movement of the conveyer belts by a predetermined pitch whenever a supply command is made, and then dropped onto a stand-by cooking plate 5 through the exit.

5 Claims, 2 Drawing Sheets

APPARATUS FOR SUPPLYING A PREDETERMINED AMOUNT OF FOOD STUFFS

BACKGROUND OF THE INVENTION AND RELATED ART STATEMENT

The present invention relates to an apparatus for supplying a predetermined amount of food stuffs, such as chopped vegetables.

In compliance with a variety of goods to be sold by automatic vending machines, recently, an automatic vending machine for a Japanese pancake has been developed. In the automatic vending machine, according to a sales command, fixed amounts of various cooking materials for a Japanese pancake are supplied, in order, to a cooking plate placed on a conveyer line in the machine, and after the cooking materials are heated and cooked, the cooked food is conveyed to a merchandise take-out port for sale.

Incidentally, among the Japanese pancake cooking materials, especially materials, such as chopped vegetables, have a smaller bulk-density when compared with a liquid or powder material, and the cooking materials themselves are entangled with each other in a stocked state, so that it is very difficult to supply a fixed quantity of the materials from a material storage.

Therefore, in order to develop a cooking material supply apparatus for chopped vegetables, the present inventor used an apparatus known as a vibration-type part feeder as a supply apparatus of cooking materials to store the chopped vegetables therein, and a load cell (weight sensor) was combined thereto, so that the chopped vegetables were supplied by operating the feeder whenever a supply command was received, at the same time the conveying quantity (weight) was measured by the load cell on an exit side, and the feeder was stopped when the chopped vegetables reached a predetermined quantity, to thereby supply the chopped vegetables from the load cell to a cooking plate.

However, although the chopped vegetables were actually supplied through the vibration-type part feeder, there were various problems such that the chopped vegetables were clogged at an exit port during operation of the material supply feeder, and the materials more than the predetermined amount were supplied at the same time, so that it was found that the vibration-type part feeder could not practically be used with reliability.

In view of the above-described problems, the object of the present invention is to provide a novel apparatus for supplying a predetermined amount of food stuffs, which can smoothly convey cooking materials, such as chopped vegetables, from a storage in a predetermined quantity without supply problems as described above.

SUMMARY OF THE INVENTION

In order to attain the above object, an apparatus for supplying a predetermined amount of food stuffs according to the present invention is formed of a pair of conveyer belts synchronously operating on both sides of a material supply path and extending in parallel along the path provided in a box-shape material storage, so that the conveyer belts are moved by a predetermined pitch whenever a supply command is made, to thereby transfer the cooking materials filled in the material supply path formed between the belts through an exit port of the path.

Also, the apparatus having the structure as described above is formed of the following additional mechanisms.

(1) A material supply path defined between a pair of conveyer belts is provided in a meandering shape in a material storage.

(2) A material cutting mechanism which opens and closes in cooperation with a conveying operation of the conveyer belts is provided at an exit port of the material supply path.

(3) A material shortage detective sensor is provided at a position near the exit port of the material supply path.

(4) A partition block is provided between the conveyer belts for holding the cooking materials filled in the material supply path from the back side thereof.

(5) A sponge-like cushion material is used as the partition block.

In the above described structure, by synchronously operating the pair of conveyer belts, the cooking materials (chopped vegetables) filled in the material supply path and sandwiched between the conveyer belts are conveyed by the belts and sent out through the exit port. Here, the conveyer belts are moved by a predetermined pitch in every time, the cooking materials are conveyed in the predetermined quantity without clogging or accumulation. Also, since the cooking materials are conveyed together with the movable conveyer belts, they are not rubbed nor damaged by surfaces of the belts even if the cooking materials, such as the chopped vegetables, are soft.

Here, by providing the pair of the conveyer belts in a meandering state in the material storage, a limited space in the material storage can be effectively used, so that a large amount of cooking materials is stored. Also, the material cutting mechanism located at the exit port of the material supply path opens and closes in cooperation with a conveying operation of the conveyer belts, wherein the cooking materials to be sent out are cut when the conveyer belts stop, and at the same time the exit of the material supply path is closed to prevent the cooking materials from being sent out excessively. Further, the material shortage detective sensor (such as transmitting-type light sensor) is provided at a position near the exit port of the material supply path to positively detect shortage of the cooking materials.

In addition, the partition block piece made of a sponge-like cushion material and provided between the conveyer belts to hold the cooking materials filled in the material supply path from the back side is conveyed together with the cooking materials and the belts in a state sandwiched therebetween. With this structure, the cooking materials in the material supply path can be stably supplied by a fixed quantity to a final stage without scattering to pieces at an end portion of the cooking materials. Also, the partition block piece made of the cushion material functions as a scraper which slides over an inner wall surface of the material storage along the material supply path, so that the cooking materials adhered to the wall surface of the material supply path are scraped out without leaving any cooking materials, and at the same time the wall surface of the storage is cleaned along the material supply path.

DETAILED DESCRIPTION OF PREFERRED EMBODIMENTS

Hereinunder, embodiments of the present invention are described based on the drawings.

Figure 1:
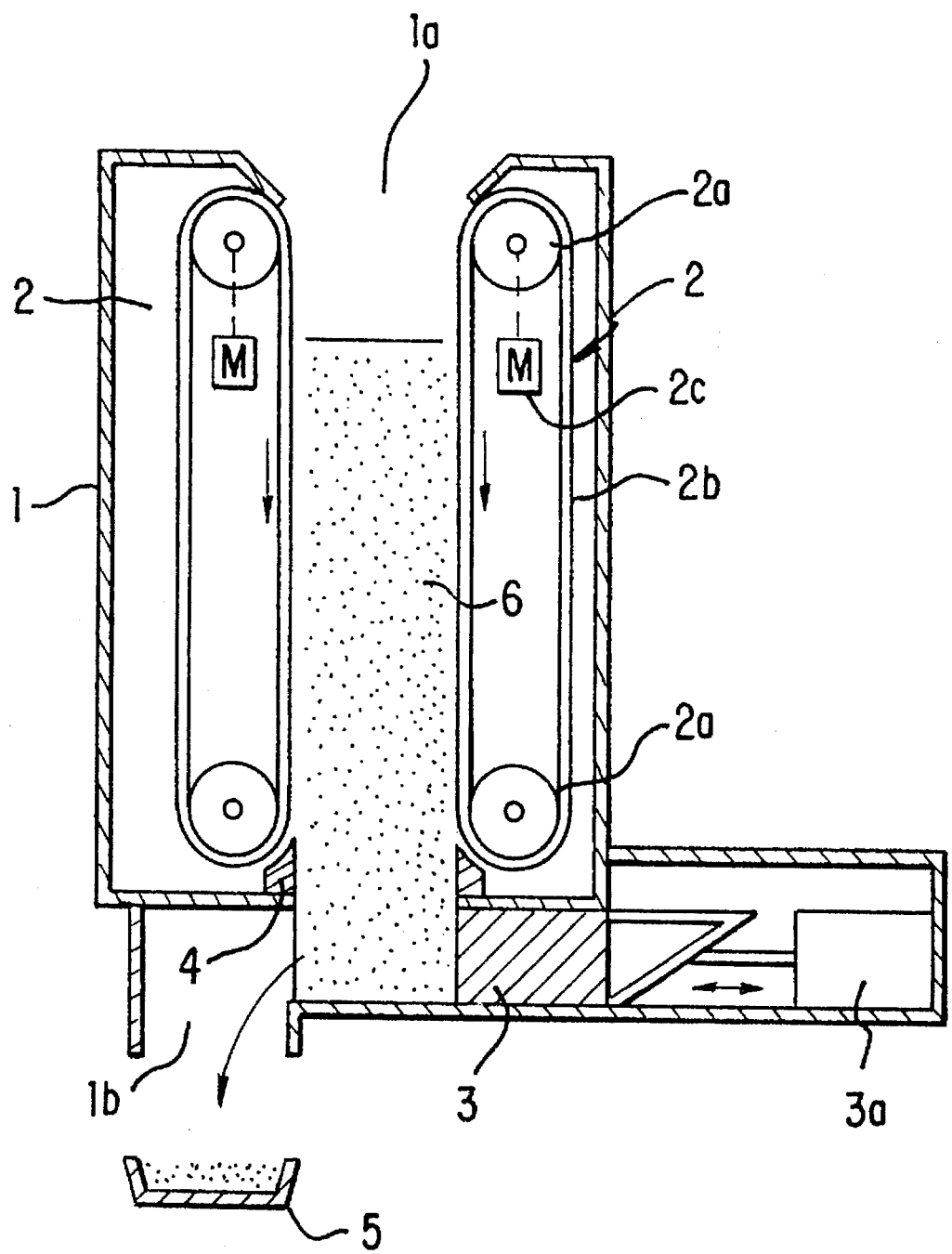
FIG. 1 is a section view of a fixed-quantity supply apparatus corresponding to a first embodiment of the present invention.

In FIG. 1, an apparatus for supplying a predetermined amount of food stuffs is formed of a material storage 1 in a box shape having an upper material supply port 1a and a lower outlet port 1b; a pair of conveyer belt devices or mechanisms 2 provided on both sides of a material supply path in the material storage 1; and a piston 3 as material cutting means provided on an outlet side of the storage 1.

In this respect, each conveyer belt device 2 includes an endless belt 2b extending between an upper pulley 2a and a lower pulley 2a, and a driving motor 2c. The left and right belt devices 2 are controlled to synchronously start and stop. Incidentally, numeral 3a represents an operation cylinder of the piston 3, numeral 4 represents scrapers provided on an outlet side of the belt. Also, numeral 5 represents a cooking plate which is conveyed by a conveyer line, not shown, passes immediately under the outlet port 1b of the material storage 1, and is transferred to a merchandise take-out port of an automatic vending machine after passing through a heating section in a later stage.

In this structure, cooking materials (chopped vegetables) 6 are filled in the material supply path defined between the conveyer belt devices 2 through the supply port 1a of the material storage 1. Under the condition, when a material supply command is supplied thereto, the driving motors 2c start to move the belts 2b by a predetermined pitch in arrow directions, and at the same time the cooking materials 6 filled in the path are conveyed downward by the belts in response to the movement thereof, so that the cooking materials are sent out by the predetermined quantity to the outlet port of the storage 1. Then, when the piston 3 is advanced from a retreated position shown in the drawing, the cooking materials 6 are cut out and only the cooking materials staying near the outlet port are pushed by the piston 3 to fall down and supplied onto the cooking plate 5 kept on standby at the position.

Figure 2:
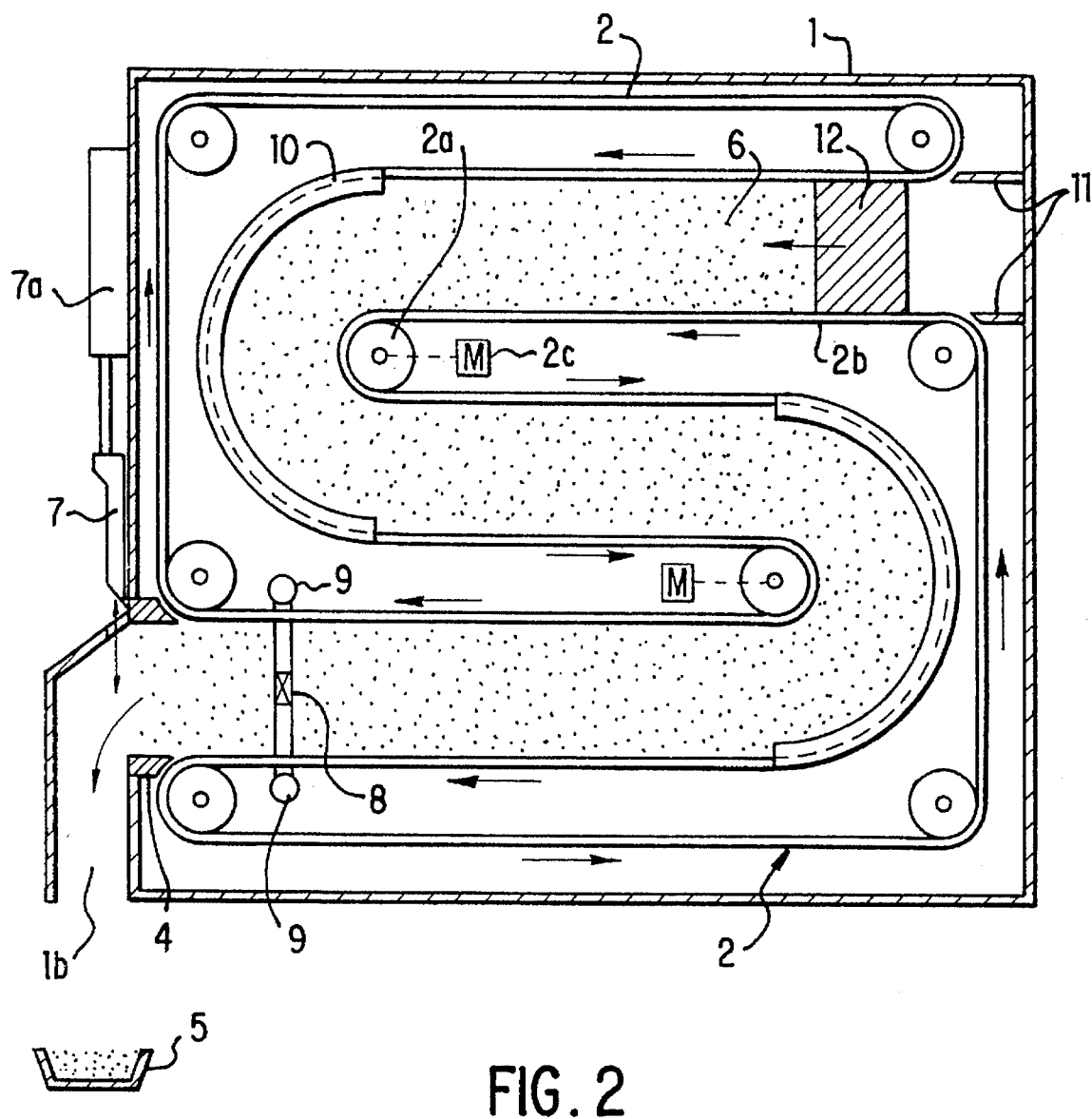
FIG. 2 is a section view of a fixed-quantity supply apparatus corresponding to a second embodiment of the present invention.

FIG. 2 shows a second embodiment of the present invention. In the drawing, a pair of conveyer belt devices 2 is provided in a meandering state in a material storage 1 in a box shape. A zigzag-shape material supply path comprising vertically arranged upper and lower portions is defined between the two conveyer belt devices 2. Incidentally, side surfaces between the conveyer belts are covered with side walls of the material storage and an opening-closing lid. Also, an outlet port 1b of the storage 1 opens at a lower front portion, and the outlet port is provided with a shutter 7 having a blade at its tip as material cutting means. Incidentally, numeral 7a represents an operation cylinder of the shutter 7.

Further, a material shortage sensor (such as a transmitting-type light sensor) 8 is disposed at a portion near the outlet side of the material supply path. The sensor 8 is held by adsorption on a wall surface of the storage 1 by suckers 9 so as to suitably adjust a detecting position. Incidentally, numeral 10 represents a guide belt in an arc shape, and 11 is a partition for the material supply path.

With the structure as described above, the cooking materials (chopped vegetables) 6 are filled into the meandering material supply path by opening the opening-closing lid of the storage 1, and at the same time a partition block 12 made of a cushion material, such as a sponge, is disposed between the conveyer belts 2b at an end portion of the cooking materials to thereby hold the cooking materials from the back side thereof. Also, the shutter 7 provided at the outlet port of the storage 1 closes the exit at a standby position by falling down from a position shown in the drawing.

Under the condition when a material conveying command is supplied thereto, the shutter 7 is elevated upward to open the path, and at the same time the pair of conveyer belt mechanisms 2 are synchronously operated to transfer the belts 2b by a predetermined pitch in arrow directions. Therefore, the cooking materials 6 filled between the belts 2b are conveyed toward the outlet port 1b, and at the same time the partition block 12 arranged at the end portion of the cooking materials 6 is also conveyed while holding the cooking materials. When the conveyer belts 2b are advanced by a predetermined pitch, the belt mechanisms 2 are stopped, and then the shutter 7 falls down from its opening position to close the path while cutting the cooking materials 6. Therefore, an amount served for one plate (a predetermined amount) of the cooking materials 6 falls down from the outlet port 1b and supplied to the standby cooking plate 5 located downward thereof. Incidentally, the quantity served at one time can be arbitrarily changed by changing a conveying pitch of the conveyer belt mechanisms 2.

Thereafter, the fixed quantity of the cooking materials is supplied to the cooking plate 5 by repeating the same operation as described above whenever a conveying command is supplied. When the cooking materials become short and the material supply path in the storage becomes empty, the sensor 8 detects the state and outputs a material shortage signal.

In this embodiment, since the material supply path is defined in a meandering state between the conveyer belt mechanisms 2, efficiency for accommodating the cooking materials 6 in the storage 1 is increased when compared with that of the first embodiment. Incidentally, the shutter 7 in the drawing may be omitted according to the property of the cooking material. However, since the shutter 7 with a blade is provided, the cooking material can be positively cut out by a predetermined quantity and at the same time an excessive amount of the material is prevented from being conveyed.

Also, with the sponge-like partition block 12 provided between the conveyer belts 2b so as to hold the cooking materials 6 from the back side thereof, the cooking materials do not fall down on an empty side at the rear portion of the supplying path, and can be stably supplied until they are used up. Further, the partition block 12 functions as a scraper sliding along both the left and right side wall surfaces of the storage 1 through the material supply path, so that the cooking materials adhering to the wall surfaces of the storage are entirely scraped out and at the same time the wall surfaces of the supply path are cleaned.

As described hereinabove, according to the structure of the present invention, since the cooking materials, such as chopped vegetables, filled in the material storage are conveyed in a state sandwiched by the conveyer belt mechanisms from both sides, the cooking materials are not clogged nor retarded, so that a fixed quantity of the cooking materials is supplied to a cooking plate smoothly. A quantity of the cooking materials conveyed at a time can be arbitrarily adjusted by changing a feeding pitch of the conveyer belts.

Also, according to the structure of the present invention, the cooking materials can be effectively accommodated in a limited space of the storage.

Further, according to the structure of the present invention, the cooking materials are cut and stably supplied in a fixed quantity whenever a supply command is made.

Still further, according to the structure of the present invention, shortage of the cooking materials in the material storage can be positively detected by the sensor.

Furthermore, according to the structure of the present invention, since the partition block disposed between the conveyer belts functions as a scraper, the cooking materials in the material supply path are prevented from falling down and adhering to the wall surfaces, so that the cooking materials can be stably supplied till they are used up, and at the same time the wall surfaces of the material supply path can be cleaned.

What is claimed is:

1. A fixed quantity supply apparatus for supplying a predetermined amount of cooking materials to a cooking plate, comprising:

a material storage having a box shape, a material supply path situated in the material storage and having an exit port, and a pair of conveyer belts provided in a meandering state in the material storage to define the material supply path therebetween, said conveyor belts synchronously running along both sides of the material supply path, said conveyer belts being moved for a predetermined pitch so that the cooking materials filled in the material supply path between the belts are sent out through the exit port of the material supply path whenever a supply command is made.

2. A fixed quantity supply apparatus as claimed in claim 1, further comprising a material cutting mechanism for opening and closing the material supply path in cooperation with operation of said conveyer belts, said material cutting mechanism being provided at the exit port of the material supply path.

3. A fixed quantity supply apparatus as claimed in claim 1, further comprising a material shortage sensor provided at a position near the exit port of the material supply path.

4. A fixed quantity supply apparatus for supplying a predetermined amount of cooking materials to a cooking plate, comprising:

a material storage having a box shape, a material supply path situated in the material storage and having an exit port, a pair of conveyer belts provided in the material storage and synchronously running along both sides of the material supply path, said conveyer belts being moved for a predetermined pitch so that the cooking materials filled in the material supply path between the belts are sent out through the exit port of the supply path whenever a supply command is made; and a partition block for holding the cooking materials filled in the material supply path from a back side provided between the conveyer belts.

5. A fixed quantity supply apparatus as claimed in claim 4, wherein said partition block is formed of a sponge-like cushion material.

* * * * *